May 20, 1958 J. R. PIERCE 2,835,872

INTERSTAGE COUPLING NETWORK

Filed Sept. 1, 1953

INVENTOR
J. R. PIERCE
BY
Hugh S. Wertz
ATTORNEY

United States Patent Office 2,835,872

Patented May 20, 1958

2,835,872

INTERSTAGE COUPLING NETWORK

John R. Pierce, Berkeley Heights, N. J., assignor to Bell Telephone Laboratories, Incorporated, New York, N. Y., a corporation of New York Application September 1, 1953, Serial No. 377,815

3 Claims. (Cl. 333—32)

This invention relates to coupling networks and more particularly to such networks for use as interstage coupling circuits for broad band amplifiers.

It has become characteristic of most tetrodes or pentodes suitable for incorporation in very broad band amplifiers that the output capacitance, which is largely made up of the plate circuit capacitance, is much smaller than the input capacitance, which it largely determined by the control grid circuit capacitance. The ratio of input to output capacitance is as high as six in present tubes with every likelihood of increasing in improved tubes. However, it becomes difficult to achieve large percentage bandwidths in multistage amplifiers with conventional interstage coupling networks when the ratio of the input capacitance of the succeeding stage to the output capacitance of the preceding stage is so high.

An object of the present invention is to increase the percentage bandwidth which can be achieved in multistage broad band amplifiers.

A related object is to provide an improved interstage coupling network for incorporation in a multistage amplifier in which the ratio of the input capacitance of a subsequent stage to the output capacitance of the preceding stage is high.

Still another object is to provide a coupling network which provides a constant transfer impedance when operating between a large capacitive mismatch.

To this end, a feature of the present invention is a four terminal coupling network comprising an exponentially tapered filter network which is a ladder network with series inductances and shunt capacitances which are exponentially tapered, or in constant ratio $a$, from section to section, and a two terminal terminating network for the ladder which simulates an infinite continuation of the ladder. Moreover, in amplifier embodiments in accordance with the invention, at the output and input circuits to be coupled by the interstage network, the output shunt capacitance and the input shunt capacitance, respectively, form substantially the full shunt capacitances of the corresponding first and last shunt arms of the ladder network.

The use of an exponentially tapered ladder network has been suggested hitherto as an interstage coupling network where large impedances transformations were desired. However, the advantages to be realized by terminating the ladder network to simulate an infinite continuation of the ladder have not hitherto been appreciated. It is found, for example, that the inclusion of a terminating network in accordance with the invention makes feasible the use of the ladder network as a band pass filter, the upper and lower cut-off frequencies of which can be chosen near the edges of the band of frequencies to be amplified. Such operation in interstage coupling applications permits a large gain-bandwidth product. On the other hand, in prior art arrangements utilizing an exponentially tapered ladder network without a terminating network of the kind characteristic of the present invention, the ladder network has generally been operated as a low pass filter with the cut-off frequency being chosen well above the range of frequencies to be amplified. This has resulted in a relatively poor gain-bandwidth product in interstage coupling applications.

The invention will be better understood from the following more detailed description taken in conjunction with accompanying drawings in which.

It is well known that in a cascade amplifier with identical interstage coupling networks and identical tubes having transconductances $g_m$, it is possible, if an appropriate impedance-transforming circuit can be found, to obtain a voltage gain per stage G, given by $$G=\frac{g_m}{\pi B\sqrt{C_{in}C_{out}}} \qquad (1)$$

where B is the band width and $C_{in}$ and $C_{out}$ are the input and output shunt capacitances of each stage. In general, it is advantageous to have $C_{in}$ and $C_{out}$ as small as possible for a high gain-bandwidth product, but as is well known, there are minimum values below which it has been impossible to go in practical tubes. Moreover, as has been pointed out above, the input shunt capacitance $C_{in}$ is generally considerably larger than the output shunt capacitance $C_{out}$. Because of this the gain-bandwidth figure which can actually be realized is smaller than that given by Equation 1, unless the interstage coupling network be made to introduce the necessary impedance transformation.

Figure 1:
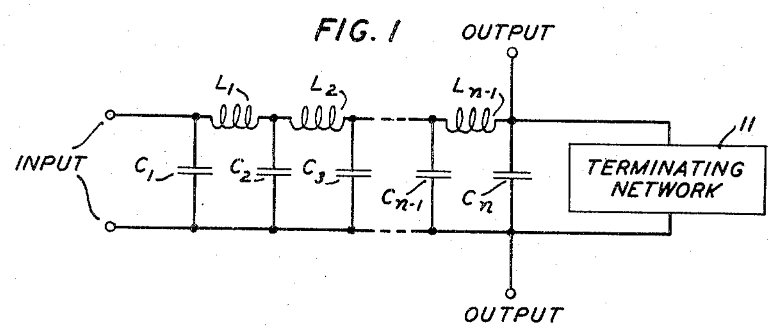
Fig. 1 shows partially in circuit form and partially in block form an interstage coupling network of the kind characteristic of the present invention comprising an exponentially tapered ladder network terminated in an impedance which simulates an infinite continuation of the ladder.

Let us consider an exponentially tapered network of the kind shown in Fig. 1 comprising series inductances and shunt capacitances in which $$L_k=a^{k-1}L_1 \qquad (2)$$

$$C_k=\frac{C_1}{a^{k-1}} \qquad (3)$$

where $a$, which is a constant less than unity is a measure of the taper, $k$ is a number from 1 to $n$ which denotes the number counted in the forward direction of the particular inductance or capacitance, and $L_1$ and $C_1$ are the values of the first series inductance and the first shunt capacitance, respectively, of the ladder. Thus by varying the value of the successive elements according to the geometric relations set forth in Equations 2 and 3, where $a$ in the case of the series inductances, and $$\frac{1}{a}$$

in the case of the shunt capacitances, are the rates of geometric progression, an exponentially tapered ladder network is formed. It should be noted that $$L_nC_n=L_kC_k=L_1C_1 \qquad (4)$$

If it is assumed that the exponentially tapered network is terminated in substantially its characteristic impedance, as is shown schematically by the block 11, so that reflections resulting from any mismatch will be insignificant, then it can be shown that the exponentially tapered network acts as a band-pass filter and that the pass band occurs for radian frequencies $\omega$ where $$a>\left(\frac{a+1}{2}-\frac{\omega^2 L_1 C_1}{2}\right)^2 \quad (5)$$

The band limits are given, accordingly, by $$\omega^2 L_1 C_1 = a+1\pm 2\sqrt{a}=(1\pm\sqrt{a})^2 \quad (6)$$

If $f_{max}$ and $f_{min}$ denote the frequencies of the upper and lower band limits, then from Equation 6 it is found that $$f_{max}=\frac{1+\sqrt{a}}{2\pi\sqrt{L_1C_1}} \quad (7)$$

$$f_{min}=\frac{1-\sqrt{a}}{2\pi\sqrt{L_1C_1}} \quad (8)$$

The bandwidth B which is the difference between $f_{max}$ and $f_{min}$ is then given by $$B=\frac{\sqrt{a}}{\pi\sqrt{L_1C_1}} \quad (9)$$

The ratio of $f_{max}$ to $f_{min}$ is given by $$\frac{f_{max}}{f_{min}}=\frac{1+\sqrt{a}}{1-\sqrt{a}} \quad (10)$$

It may be helpful to describe at this point the considerations applicable to the design of a suitable exponentially tapered network in accordance with the invention. First, from the available tubes, there can be chosen one whose transconductance $g_m$, input capacitance $C_{in}$ and output capacitance $C_{out}$ makes possible the desired gain-bandwidth product in accordance with the relationship defined by Equation 1.

It can also be seen that the ratio $$\frac{C_{out}}{C_{in}}=a^{n-1} \quad (11)$$

if the output capacitance $C_{out}$ is to be the first shunt capacitance and the input capacitance $C_{in}$ is to be the last shunt capacitance of the ladder network. Here $n$ is used to denote the total number of shunt capacitances. On the basis of Equations 10 and 11 there can be chosen values of $f_{max}$ and $f_{min}$, $a$ and $n$, consistent with the bandwidth desired and the input and output capacitances which can be realized. Then, on the basis of the values of $a$, $f_{max}$ and $C_{out}$ available, the value of the first series inductance L can be determined by reference to Equation 7. The subsequent sections of the ladder network can then be designed in accordance with Equations 2 and 3.

Additionally, to complete the interstage network, it is important to provide a terminating network which simulates an infinite continuation of the ladder, as is characteristic of the invention. From an analysis of the ladder network, it is found that the necessary termination should have an impedance $Z_t$ given by $$Z_t=\sqrt{\frac{L_n}{C_n}}\left[\frac{\left(a-\left(\frac{W^2-a-1}{2}\right)^2\right)^{1/2}}{W}+j\frac{(W^2-a+1)}{2W}\right] \quad (12)$$

where $C_n$ is the value of the last shunt capacitances of the ladder network, $L_n$ is equal to $a$ times the last series inductance $L_{n-1}$, and W is a dimensionless parameter equal to $\omega\sqrt{L_nC_n}$.

In terms of an admittance $Y_t$ this becomes $$Y_t=\sqrt{\frac{C_n}{L_n}}\left[\frac{\left(a-\left(\frac{W^2-a-1}{2}\right)^2\right)^{1/2}}{W}-\frac{j(W^2-a+1)}{2W}\right] \quad (13)$$

Substituting for $L_n$ and $C_n$ their equivalents according to Equations 2 and 3, respectively, it appears that $$Y_t=\frac{1}{a^{n-1}}\sqrt{\frac{C_1}{L_1}}\left[\frac{\left(a-\left(\frac{W^2-a-1}{2}\right)^2\right)^{1/2}}{W}-\frac{j(W^2-a+1)}{2W}\right]$$

$$Z_t=a^{n-1}\sqrt{\frac{L_1}{C_1}}\left[\frac{\left(a-\left(\frac{W^2-a-1}{2}\right)^2\right)^{1/2}}{W}+j\frac{(W^2-a+1)}{2W}\right]$$

Figure 2:
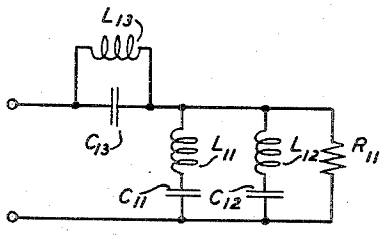
Figs. 2 and 3 are circuit schematics of two typical terminating networks for use with exponentially tapered ladder networks in accordance with the invention.
Figure 3:
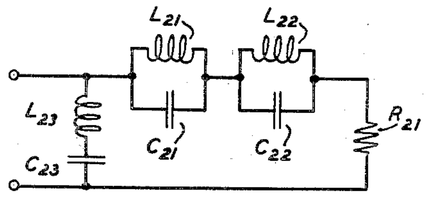

It is to be noted that the real parts of $Z_t$ and $Y_t$ go to zero at the edges of the band, while the reactive portion is inductive over the band. Typical simple terminating networks which provide an impedance of the kind desired are shown in Figs. 2 and 3. Additionally, a somewhat more complex terminating network which can be utilized advantageously is described in Patent 2,710,944 issued June 14, 1955 to J. T. Bangert. This terminating network comprises effectively an m-derived band filter and a parallel combination of a negative capacitance and a positive inductance, the negative capacitance being realized by including as part of the terminating network an extra section tapered as a continuation of the ladder network but whose final shunt capacitance is reduced by the value of the negative capacitance desired.

In the terminating network shown in Fig. 2, an inductance $L_{13}$ shunted by a capacitance $C_{13}$ forms a series arm of the terminating network having shunt arms comprising an inductance $L_{11}$ in series with a capacitance $C_{11}$, an inductance $L_{12}$ in series with a capacitance $C_{12}$, and a resistance $R_{11}$. The values of $L_{11}$ and $C_{11}$ are chosen so that the shunt arm which they form resonates at or near the lower band limit $f_{min}$, the values of $L_{12}$ and $C_{12}$ are chosen so that the shunt arm formed thereby resonates at or near the upper band limit $f_{max}$, and the values of $L_{13}$ and $C_{13}$ are chosen to make their combination inductive throughout the pass band. The value of $R_1$ must be chosen so that the resistive component of Equation 12 is realized as closely as possible.

In the terminating network shown in Fig. 3, an inductance $L_{23}$ in series with a capacitance $C_{23}$ forms a shunt arm and parallel combinations of inductance $L_{21}$ and capacitance $C_{21}$ and inductance $L_{22}$ and capacitance $C_{22}$ form a series arm, and the resistance $R_{21}$ forms the terminating resistance. Here the value of $L_{21}$ and $C_{21}$ are chosen so that their parallel combination resonates at or near the lower band limit $f_{min}$, the values of $L_{22}$ and $C_{22}$ are chosen so that their parallel combination resonates at or near the upper band limit $f_{max}$, and the values of $L_{13}$ and $C_{13}$ are chosen to make their series combination inductive throughout the pass band. Similarly, the value of $R_{21}$ must be chosen so that the resistive component of Equation 12 is substantially realized.

Various other terminating networks can, of course, be devised to provide the desired characteristics.

Figure 4:
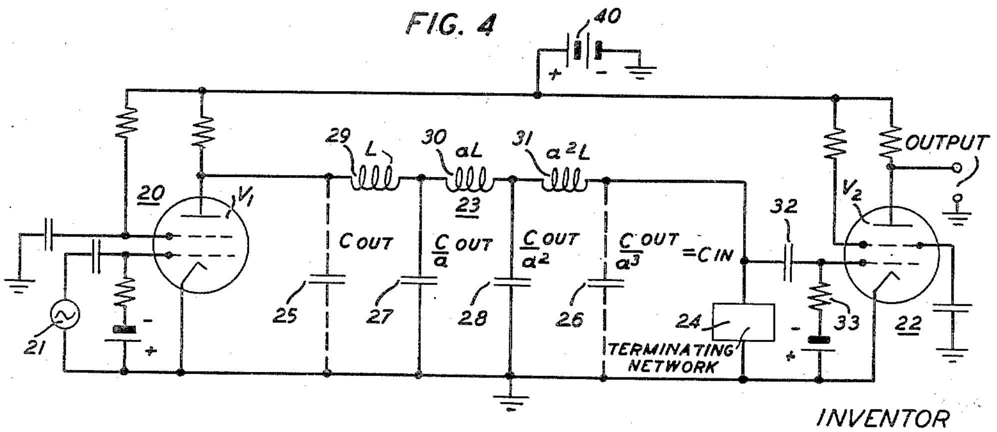
Fig. 4 shows as a specific illustrative embodiment of the invention a two stage amplifier utilizing for interstage coupling a three section exponentially tapered ladder network suitably terminated.

Fig. 4 shows by way of example for purposes of illustration a two-stage amplifier which utilizes an interstage coupling network of the kind which forms the principal feature of the present invention. In the first stage 20, the tetrode V1, has an input signal applied from a suitable input source 21 to its control grid-cathode circuit. Plate and screen voltages are applied from a suitable voltage source 40 while the cathode is operated at reference or ground potential. In these respects, stage V1 is operated in well-known fashion, as an amplifying element. Then, as is characteristic of multistage amplifiers, the output developed by this first stage is abstracted from the plate-cathode circuit of tube V1 and applied as an input by way of an interstage coupling network to the control grid-cathode circuit of the tetrode V2 which forms the succeeding stage 22 of the two-stage amplifier. In accordance with the principal feature of the invention, the interstage network coupling the output of stage 20 and the input of stage 22 comprises a multi-section exponentially tapered ladder network 23 of shunt capacitances and series inductances of the kind described in connection with Fig. 1, together with a terminating network 24 of which typical examples have been described in connection with Figs. 2 and 3. The second stage 22 is otherwise conventional. Plate and screen voltages are applied from voltage source 40 and the cathode is operated at reference or ground potential. A relatively large coupling capacitance 32 and grid leak resistance 33 together with the grid bias voltage supply 34 are included in the grid-cathode circuit of tube V2 in conventional fashion. In accordance with one distinguishing characteristic of the ladder network, the first shunt capacitance 25 of the first section of the ladder network 23 is the entire output capacitance of stage 20. In this case, it is the capacitance to ground from the plate of tube V1 including such stray capacitances as socket and lead capacitances together with the plate-to-cathode capacitance of the tube V1. In accordance with another distinguishing characteristic of the ladder network 23, the final shunt capacitance 26 of the end section of the ladder network 23 is the entire input capacitance of the stage 22. In this case, this is the capacitance to ground from the control grid of tube V2 including such stray capacitances as socket and lead capacitances together with the control grid-to-cathode capacitance of the tube V2. The ladder network 23 shown comprises three sections so that the capacitance 25 ($C_{out}$) is related to the capacitance 26 ($C_{in}$) as $$\frac{C_{out}}{C_{in}}=a^3$$

and the intermediate shunt capacitances 27 and 28 have values $$\frac{C_{out}}{a} \text{ and } \frac{C_{out}}{a^2}$$

respectively. Moreover, the three series inductances 29, 30 and 31 have inductive values L, $a$L and $a^2$L, respectively.

It is to be understood that the specific embodiments described are merely illustrative of the general principles of the invention. Various modifications in the specific form of the terminating networks used with the ladder network or in the specific circuitry of the several amplifier stages can be devised by one skilled in the art without departing from the spirit and scope of the invention. Moreover, the principles of the invention are applicable to special forms of amplifier tubes, for example of the kind described in Patent 2,747,138 issued May 22, 1956, to C. T. Goddard and N. C. Wittwer, Jr. in which expedients are utilized to minimize the effects of stray capacitances including the use of impedance transforming networks enclosed within the tube envelope. Moreover, it may be advantageous to utilize the various inductances associated with the tube elements and connections thereto as portions of the necessary inductances of the ladder and terminating networks.

What is claimed is:

1. An interstage network for coupling the output of a first amplifier stage having a low output capacitance to a second amplifier stage having a higher input capacitance, comprising a ladder network of series inductive elements and shunt capacitive elements, the inductance of successive series inductance elements decreasing geometrically at a constant rate $a$, the capacitance of successive shunt capacitive elements increasing geometrically at a constant rate $$\frac{1}{a}$$

where $a$ is a constant less than unity, characterized in that the output capacitance of the first stage and the input capacitance of the second stage serve as first and last shunt capacitances, respectively, of the ladder network, and a terminating impedance corresponding to an infinite continuation of the ladder network, said terminating network comprising a series arm including an inductance in parallel with a capacitance and a first shunt arm including an inductance in series with a capacitance and a second shunt arm comprising an inductance in series with a capacitance.

2. An interstage network for coupling the output of a first amplifier stage to a second amplifier stage comprising a ladder network of series inductive elements and shunt capacitance elements, the inductance of successive series inductive elements decreasing geometrically at a constant rate $a$, the capacitance of successive shunt capacitive elements increasing geometrically at a constant rate $$\frac{1}{a}$$

and a terminating network having the impedance of an infinite continuation of the ladder network, said terminating network comprising a series arm including an inductance in parallel with a capacitance which arm is inductive throughout the operating band and a first shunt arm including an inductance in series with the capacitance which arm is resonant at substantially the upper limit of the operating range and a second shunt arm comprising an inductance in series with a capacitance which arm is resonant at substantially the lower limit of the operating range.

3. An interstage network for coupling the output of the first amplifying stage having a low output capacitance to a second amplifier stage having a high input capacitance comprising an exponentially tapered ladder network of series inductive elements and shunt capacitive elements, and a terminating network having a characteristic impedance of an infinite continuation of the exponentially tapered ladder network, and characterized in that the output capacitance of the first amplifying stage and the input capacitance of the second amplifying stage serve as the first and last shunt capacitances respectively of the ladder network, said terminating network comprising a series arm including an inductance in parallel with a capacitance which arm is inductive throughout the operating band and a first shunt arm including an inductance in series with the capacitance which arm is resonant at substantially the upper limit of the operating range and a second shunt arm comprising an inductance in series with a capacitance which arm is resonant at substantially the lower limit of the operating range.

References Cited in the file of this patent

UNITED STATES PATENTS

| | | |
|---|---|---|
| 1,788,538 | Norton | Jan. 13, 1931 |
| 1,926,807 | Hansell | Sept. 12, 1933 |
| 2,167,134 | Wheeler | July 25, 1939 |
| 2,204,712 | Wheeler | June 18, 1940 |
| 2,710,944 | Bangert | June 14, 1955 |